July 14, 1953  A. J. HORNFECK  2,645,126
TEMPERATURE MEASURING APPARATUS
Filed Dec. 13, 1947
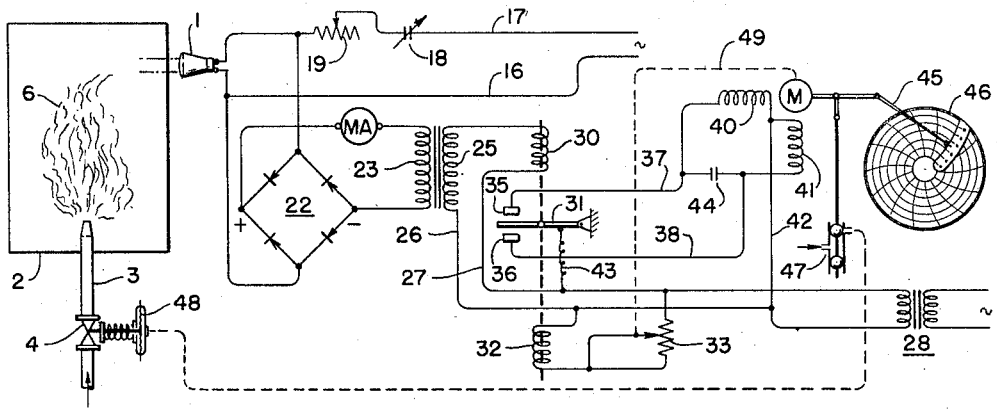
FIG. 1
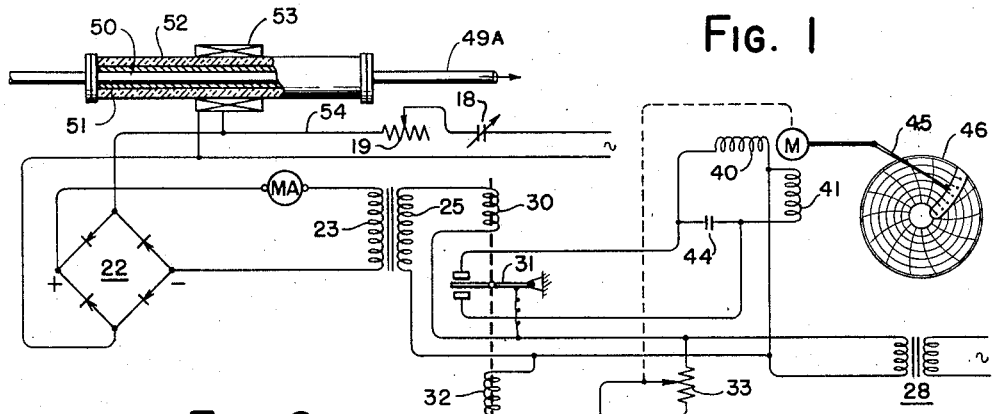
FIG. 2
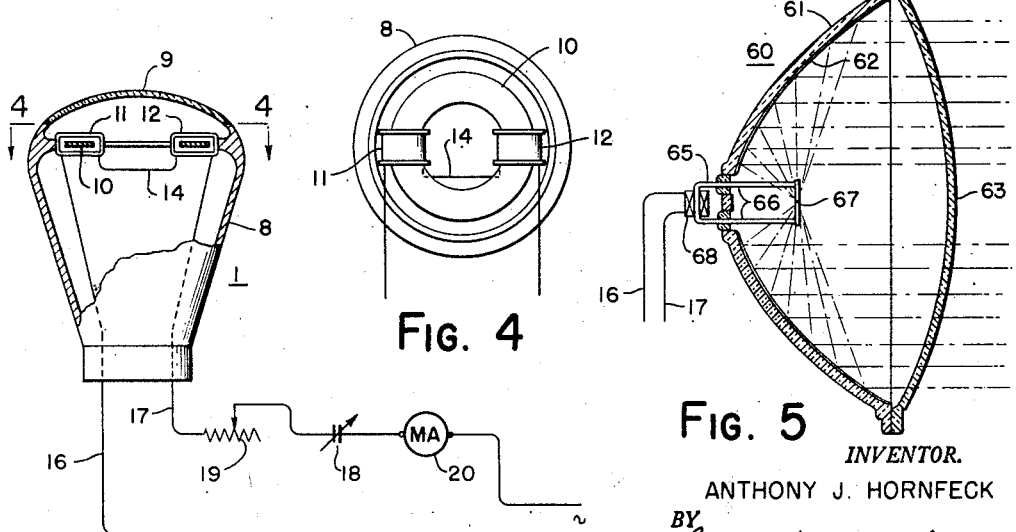
FIG. 3
FIG. 4
FIG. 5
*INVENTOR.*
ANTHONY J. HORNFECK
BY Raymond W. Jenkins
*ATTORNEY*

Patented July 14, 1953

2,645,126

UNITED STATES PATENT OFFICE 2,645,126

TEMPERATURE MEASURING APPARATUS

Anthony J. Hornfeck, Lyndhurst, Ohio, assignor to Bailey Meter Company, a corporation of Delaware Application December 13, 1947, Serial No. 791,496

3 Claims. (Cl. 73—355)

This invention relates to apparatus for measuring temperature, and more particularly to apparatus for translating variations in temperature into corresponding changes in an electrical effect.

It is well known that a coil connected to a source of alternating current will offer an impedance to the flow of current in proportion to the permeability of a core arranged within the coil, and that a core composed of certain metals will vary in permeability in response to changes in temperature. A measurement of temperature cannot be made in some cases by the ordinary measuring instruments because of the inability to locate the instrument at the point where it might be subjected to the temperature to be measured. It has been found that a core varying in permeability with temperature may be insulated from the surrounding atmosphere and subjected to heat from a source to effect a variation in the reactance of a coil so as to provide an indication of the temperature at the source.

An object of my invention is to provide an improved apparatus for measuring temperature. Another object is to provide an improved apparatus operating in response to changes in temperature for producing corresponding changes in an electrical effect which may be measured as an indication of temperature. Yet another object is to provide a core member insulated from temperatures except that to be measured, and operating on changes in temperature to effect a variation in the reactance of a coil so as to establish electrical conditions that may be measured as indications of the temperature. Other objects will appear in the course of the following description.

In the accompanying drawing are shown several forms which my invention may assume in practice.

In this drawing:

Fig. 1 is a schematic diagram of a temperature measuring and controlling system incorporating one form of my improved apparatus.

Fig. 2 is a schematic diagram of a system similar to that of Fig. 1 but incorporating my improved apparatus in another form.

Fig. 3 is an enlarged sectional view of the temperature responsive apparatus included in the system of Fig. 1.

Fig. 4 is a view taken on the plane of the line 4—4 of Fig. 3.

Fig. 5 is a sectional view of another form of my apparatus.

Referring to Fig. 1 it will be noted that there is shown a system in which a device 1 in the nature of a bolometer is sensitive to heat radiated from a furnace 2 that is fired by fuel supplied through a conduit 3 under the control of a valve 4. The device 1 may be directed on the flame 6 within the furnace, on the wall of the furnace, or on any material or object within the furnace which is being heated and whose temperature is to be determined or controlled. This device comprises, as shown in Figs. 3 and 4, a casing 8 having a window 9 through which radiant heat may pass from the source to the interior of the casing. Supported within the casing adjacent the window is an annular core member 10 made of an alloy which varies in permeability with changes in temperature, and arranged on the core member are coils 11 and 12 connected in series with each other by a conductor 14. The interior of the casing 8 is either evacuated or filled with an inert gas, such as argon, nitrogen, or a mixture thereof, so as to insulate the core member from the ambient temperatures.

The core member is made in the shape of a relatively thin ring having a small mass so that only a small amount of energy need be absorbed or dissipated during changes in temperature to effect substantially immediate corresponding changes in its temperature and permeability. This is necessary since only a relatively small amount of energy can be made available by the radiant heat transmitted. Because of the small mass of the core member, unit changes in temperature would effect but relatively small changes in the impedance of the coils 11 and 12 if they were energized by alternating current of the usual commercial frequency, as for example 60 cycles per second. The change in impedance of the coils may be materially increased, however, by energizing them with alternating current at a frequency in the order of 50,000 to 100,000 cycles per second. The coils are therefore connected by conductors 16 and 17 to a source of high frequency alternating current for effecting high impedance changes in the coils and corresponding changes in the flow of current. A variable condenser 18 and an adjustable resistance 19 are provided for regulating the flow of current, and a milliameter 20 may be connected in the circuit as shown in Fig. 3, for measuring the current flow as an indication of temperature. If it is desired that the device be very sensitive to changes in temperature, the condenser 18 and the resistance 19 are adjusted to provide a substantially resonant circuit. For measuring temperature changes over a long range, the condenser and the resistance are adjusted so that the circuit is further out of resonance.

The system of Fig. 1 provides for the recording and regulation of the temperature measured by the device 1. Connected to the conductors 16, 17 is a bridge rectifier 22 for producing a direct current proportional to the potential drop across the device. The D.-C. output of the rectifier is supplied to a control winding 23 of a saturable core reactor having an A.-C. output winding 25. As known, the impedance of the output winding varies in functional relation to the energization of the control winding, which in turn varies with the potential drop across the device 1. The winding 25 is connected through the conductors 26 and 27 to the secondary of a transformer 28 which is energized from a source of 60 cycle alternating current, and a solenoid 30 is connected in circuit with the winding 25 for producing an operating force on a switch arm 31 proportional to the flow of current. Another solenoid 32 is connected with an adjustable resistance 33 across the secondary winding of the transformer 28, and is operatively connected to the switch arm 31 for producing a force on the latter opposite to that of the solenoid 30. Switch contacts 35 and 36 are arranged to be engaged selectively by the arm 31, and these contacts are connected by conductors 37 and 38 to the ends of motor windings 40 and 41 arranged 90° apart electrically. The other ends of the windings are connected by a conductor 42 to one end of the secondary winding of the transformer 28, and the switch arm 31 is connected by a conductor 43 to the other end of this secondary winding. A condenser 44 is connected between the conductors 37, 38 so that an engagement of the switch arm 31 with the contact 35 results in a circuit from one terminal of the power transformer through the condenser and the motor winding 41 to the other terminal of the transformer, as well as a direct connection of the winding 40 across the transformer. Engagement of the switch arm with the contact 36 results in a connection of the condenser 44 in series with the winding 40 across the transformer, and a connection of the winding 41 directly across the transformer. The motor M operates in one direction or the other depending upon which circuit is completed, and an indicating arm 45 is moved over a chart 46 to provide an indication and record of the temperature measured. A pilot valve 47 is operatively connected to the motor for controlling the supply of pressure fluid to a diaphragm 48 regulating the position of the valve 4. An operative connection 49 is provided between the motor and a movable contact on the resistance 33 for varying the flow of current through the solenoid 32 in proportion to the operation of the motor.

When the furnace temperature is at the desired value, the voltage across the device 1 effects an energizing of the solenoid 30 to produce a force which balances the force of the solenoid 32. The switch arm is then located in its neutral position and the motor is stationary. If the temperature increases, then the voltage across the device 1 is increased and causes the solenoid 30 to overcome the solenoid 32 and engage the switch arm with the contact 35 for energizing the motor windings and effecting its operation to position the indicator 45 and to adjust the pressure on the diaphragm 48 so as to reduce the fuel supply. It also positions the contact on the resistance 33 until the force exerted by the solenoid 32 equals that of the solenoid 30, resulting in a positioning of the arm 31 between its contacts and a stopping of the motor. A drop in the temperature results in an operation of the motor in the opposite direction to position the indicator arm and to adjust the valve 4 for increasing the supply of fuel. The contact on the resistance 33 is also positioned in the opposite direction to effect a rebalance of the system.

Fig. 2 shows a mechanism for measuring the temperature of a fluid within a conduit 49A of such small diameter that it is impossible to insert a temperature responsive element into the conduit for direct contact by the fluid. To obtain a measurement of the temperature, a section 50 of the conduit 49A is engaged by a core member 51 made of an alloy which varies in permeability with changes in temperature, and an insulating material 52 is placed over the member 51 so that its temperature may become equal to that of the fluid. A coil 53 is placed around the insulated core member 51 and is energized from a source of high frequency through conductors 54 and 55. A rectifier 22 is subjected to the voltages across the terminals of the winding 53 for supplying direct current to the control winding 23 of the saturable core reactor as in Fig. 1. The motor operates in one direction or the other, as determined by the position of the switch arm 31, and positions the contact of the resistance 33 until the switch arm is moved to its open position. If desired, the pipe section 50 could be made of a material varying in permeability, and the core member 51 would no longer be needed. The insulated pipe section would be heated to the temperature of the fluid passing through it, and the coil would vary in reactance with the changes in permeability.

Fig. 5 shows a bolometer device 60 similar to the device in Fig. 3, for translating heat energy into an electrical effect. This device includes a member 61 of paraboloidal shape having a reflecting surface 62. A cover glass 63 engages the forward edge of the member 61 and is held by suitable means, not shown, in sealing engagement therewith. A core member 65 is provided with leg portions 66 extending through the member 61 and supporting another portion 67 at the focal point of the member 61. The leg portions are made of a material to give a substantially constant electrical permeability regardless of changes in temperature, and the portion target 67 is made of an alloy which varies in permeability with changes in temperature. Arranged in the core member outside of the member 61 is a coil 68 connected to the conductors 16 and 17 which lead, as shown in Fig. 3, to a source of alternating current. The space enclosed by the member 61 and the cover glass 63 is either evacuated or filled with an inert gas so as to insulate the enclosed portion of the core member from the surrounding atmosphere. It will be noted that radiant heat passing through the cover glass will be reflected from all points of the surface 62 to the core portion 67 and effect a heating of the latter to a temperature much higher than would be obtained with the device of Fig. 3. The change in the temperature of the portion 67 per unit change in the energy transmitted from the source will be much greater by reason of concentration of the energy to a small portion of the core member, and the device is therefore adapted to respond to very small amounts of energy transmitted to it from the source.

This application constitutes a continuation-in-part of my copending application Serial No. 506,631, filed October 18, 1943, now abandoned.

While there are described in this application several forms which my invention may assume in practice, it will be understood that it may be modified and embodied in various other forms without departing from its spirit or the scope of the appended claims.

What I claim as new and desire to secure by United States Letters Patent is:

1. A bolometer to look at a source of thermal radiation and be responsive to the magnitude thereof, comprising in combination, a housing including a paraboloidal section having an inner reflecting surface and a window section sealed to the rim of the first section, means in said housing reducing the thermal conductivity therein substantially below that of air at atmospheric pressure, a radiation receiving target of small dimensions along the axis of the first section concentrated at and adjacent the focal center of the reflecting surface in the plane of the latus rectum thereof, said target comprising a sheet of metal the magnetic permeability of which varies widely with temperature, a U-shaped rod of metal the magnetic permeability of which varies little with temperature, the base of said U being outside the first housing section and the legs extending in a gas tight manner therethrough and being secured to said target metal to support it and form a closed magnetic core, and a multiturn induction coil mounted on said core and subject to change in reactance as the permeability of said target changes with temperature.

2. A temperature measuring device comprising, in combination, a gas-tight housing including a paraboloidal section having an inner reflecting surface and a window section sealingly engaging the rim of said paraboloidal section, a core member having a portion varying in permeability with changes in temperature and having said portion only located at the focus of said paraboloidal section, an induction coil associated with said core member so that its impedance to the flow of alternating current varies with the permeability of said core, a circuit including said coil connected to a source of alternating current, and means for measuring the voltage drop across the coil as a measure of temperature, said core having leg portions extending through said paraboloidal section to the exterior thereof where they are joined to form a closed loop, and said coil being arranged on said core at the exterior of said housing.

3. A temperature measuring device comprising in combination, an induction coil, a core for said coil at least a portion of which is exposed outside of the coil and has a permeability varying with temperature so that the impedance of the coil is a function of the temperature of the core, a closed housing for said core portion, a window in said housing to freely admit radiant heat to said core portion therein, said housing having a reduced gas pressure therein to insulate the core portion from ambient temperatures, a circuit for energizing said coil from a source of alternating current, means for determining an electrical condition in said circuit as a measure of the temperature, the alternating current source having a frequency of the order of 50,000 to 100,000 cycles per second, and a variable resistance and a variable condenser connected in said circuit and adjusted to substantially resonate the circuit at the coil impedance range resulting from the expected temperature range.

ANTHONY J. HORNFECK.

References Cited in the file of this patent

UNITED STATES PATENTS

| Number | Name | Date |
| --- | --- | --- |
| 1,099,199 | Parker | June 9, 1914 |
| 1,553,789 | Moeller | Sept. 15, 1925 |
| 1,943,619 | Mudge et al. | Jan. 16, 1934 |
| 1,945,378 | Robbins | Jan. 30, 1934 |
| 2,083,317 | Dallenbach | June 8, 1937 |
| 2,144,519 | Wilson et al. | Jan. 17, 1939 |
| 2,222,425 | Wehe | Nov. 19, 1940 |
| 2,350,329 | Hornfeck | June 6, 1944 |
| 2,437,085 | Evans | Mar. 2, 1948 |

FOREIGN PATENTS

| Number | Country | Date |
| --- | --- | --- |
| 671,273 | Germany | Feb. 3, 1939 |
| 824,981 | France | Feb. 21, 1938 |